(12) United States Patent
Doi et al.

(10) Patent No.: US 11,661,000 B2
(45) Date of Patent: *May 30, 2023

(54) LEVER SWITCH AND AUTOMATIC LIGHT CONTROL DEVICE

(71) Applicant: TOYOTA JIDOSHA KABUSHIKI KAISHA, Toyota (JP)

(72) Inventors: Keisuke Doi, Nisshin (JP); Yuji Imai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

This patent is subject to a terminal disclaimer.

(21) Appl. No.: 17/073,473

(22) Filed: Oct. 19, 2020

(65) Prior Publication Data
US 2021/0031677 A1    Feb. 4, 2021

Related U.S. Application Data

(63) Continuation of application No. 16/546,341, filed on Aug. 21, 2019, now Pat. No. 10,843,621.

(30) Foreign Application Priority Data

Oct. 16, 2018    (JP) .............................. JP2018-195047

(51) Int. Cl.
*B60Q 1/14* (2006.01)
*H01H 25/04* (2006.01)

(52) U.S. Cl.
CPC ......... *B60Q 1/1453* (2013.01); *B60Q 1/1423* (2013.01); *H01H 25/04* (2013.01); *H01H 2221/016* (2013.01); *H01H 2221/08* (2013.01)

(58) Field of Classification Search
None
See application file for complete search history.

(56) References Cited

U.S. PATENT DOCUMENTS 6,518,524 B1 *   2/2003   Brandt ................. B60Q 1/1476
                                            200/61.54
6,781,072 B2     8/2004   Uchiyama et al.
(Continued)

FOREIGN PATENT DOCUMENTS

DE    102012014929 A1    1/2014
EP        2689965 A1    1/2014
(Continued)

OTHER PUBLICATIONS

Jan. 16, 2020 Office Action issued in U.S. Appl. No. 16/546,341.
Jul. 21, 2020 Notice of Allowance Issued in U.S. Appl. No. 16/546,341.

*Primary Examiner* — Crystal L Hammond
(74) *Attorney, Agent, or Firm* — Oliff PLC (57) ABSTRACT

A lever switch includes a lever main body and a rotary operation element rotatably provided at a tip end portion of the lever main body. The rotary operation element is provided with a light ON switch position at which an instruction to cause head lights and small lights to be on at all times is issued, an automatic light switch position at which an instruction to set an automatic light mode, in which a turned-on state of the head lights and the small lights is controlled based on the intensity of illumination in the vicinity of the vehicle, is issued, and a light OFF switch position at which an instruction to turn the head lights off is issued, the light ON switch position, the automatic light switch position, and the light OFF switch position being arranged in an order along a rotation direction.

10 Claims, 6 Drawing Sheets

(56) References Cited

U.S. PATENT DOCUMENTS

| | | | |
|---|---|---|---|
| 7,449,997 B2 * | 11/2008 | Furusawa | B60Q 1/18 340/468 |
| 7,755,294 B2 * | 7/2010 | Shelton | B60Q 1/1423 315/159 |
| 7,759,819 B2 * | 7/2010 | Michiyama | B60Q 1/1423 362/465 |
| 8,710,384 B2 * | 4/2014 | Son | B60Q 1/00 200/18 |
| 8,853,946 B2 | 10/2014 | Wolski et al. | |
| 2003/0098223 A1 * | 5/2003 | Uchiyama | B60Q 1/1476 200/61.54 |
| 2005/0036325 A1 | 2/2005 | Furusawa et al. | |
| 2005/0039969 A1 | 2/2005 | Laukkanen | |
| 2008/0100139 A1 * | 5/2008 | Michiyama | B60R 1/12 307/10.8 |
| 2008/0246404 A1 | 10/2008 | Shelton et al. | |
| 2013/0294100 A1 * | 11/2013 | Ishizaki | B60Q 1/143 362/465 |
| 2014/0029277 A1 | 1/2014 | Hartmann et al. | |
| 2015/0035435 A1 * | 2/2015 | Alberti | B60Q 1/32 315/82 |
| 2017/0066368 A1 | 3/2017 | Miller | |
| 2017/0162347 A1 * | 6/2017 | Harazawa | G05G 1/08 |
| 2020/0211805 A1 * | 7/2020 | Nishinakama | H05K 1/118 |
| 2021/0023980 A1 * | 1/2021 | Shimada | B60Q 1/1476 |

FOREIGN PATENT DOCUMENTS

| | | |
|---|---|---|
| JP | S57-150041 U | 9/1982 |
| JP | H01-148636 A | 6/1989 |
| JP | 2002-002370 A | 1/2002 |
| JP | 2008114655 A | 5/2008 |
| WO | 2019/194212 A1 | 10/2019 |

* cited by examiner

⟨AUTOMATIC LIGHT SWITCH POSITION⟩

| ON/OFF STATE | FULLY TURNED-ON STATE [A] | | SIDE-MARKER LIGHT TURNED-ON STATE [B] | | FULLY TURNED-OFF STATE [C] | |
|---|---|---|---|---|---|---|
| | HEAD LIGHTS: ON / SMALL LIGHTS: ON | | HEAD LIGHTS: OFF / SMALL LIGHTS: ON | | HEAD LIGHTS: OFF / SMALL LIGHTS: OFF | |
| TURNING-OFF OPERATION | NO | YES (FOR SHORT TIME) | NO | YES (FOR SHORT TIME) | NO | YES |
| VEHICLE SPEED IS GREATER THAN ZERO | FULLY TURNED-ON STATE | FULLY TURNED-ON STATE | FULLY TURNED-ON STATE (B→A) | FULLY TURNED-ON STATE (B→A) | FULLY TURNED-ON STATE (C→A) | FULLY TURNED-ON STATE (C→A) |
| VEHICLE SPEED IS ZERO | FULLY TURNED-ON STATE | SIDE-MARKER LIGHT TURNED-ON STATE (A→B) | SIDE-MARKER LIGHT TURNED-ON STATE | FULLY TURNED-OFF STATE (A→B→C or A→C) | FULLY TURNED-ON STATE (B→A) | FULLY TURNED-OFF STATE (B→C) | FULLY TURNED-OFF STATE | FULLY TURNED-ON STATE (C→A) |

US 11,661,000 B2

LEVER SWITCH AND AUTOMATIC LIGHT CONTROL DEVICE

INCORPORATION BY REFERENCE

This is a continuation of U.S. patent application Ser. No. 16/546,341, filed Aug. 21, 2019, which claims the benefit of Japanese Patent Application No. 2018-195047, filed Oct. 16, 2018. The disclosure of each of the above-identified prior applications is hereby incorporated by reference in its entirety.

BACKGROUND

1. Technical Field

The disclosure relates to a level switch controlling lights provided in a vehicle and an automatic light control device including the lever switch.

2. Description of Related Art

A device that suppress a vehicle from traveling at night with no light has been proposed in Japanese Unexamined Patent Application Publication No. 01-148636 (JP 01-148636 A). In the case of the device described in JP 01-148636 A, if head lights are temporarily turned off with a vehicle waiting for a traffic signal or the like at the time of nighttime driving and the head lights are not turned on when the vehicle starts to move thereafter, a warning sound is output to warn a driver.

SUMMARY

However, in the case of the device described in JP 01-148636 A, if the driver does not notice the warning sound for warning the driver which is output from the device when the vehicle starts to move with the head lights turned off, an operation of turning the head lights on may not be performed and the vehicle may travel with no light.

The disclosure provides a lever switch capable of performing light control with which a vehicle can be suppressed from traveling with no light and an automatic light control device including the lever switch.

A first aspect of the disclosure relates to a lever switch including a lever main body and a rotary operation element rotatably provided at a tip end portion of the lever main body. The rotary operation element is provided with a light ON switch position at which an instruction to cause head lights and small lights installed in a vehicle to be on at all times is issued, an automatic light switch position at which an instruction to set an automatic light mode, in which a turned-on state of the head lights and the small lights is controlled based on the intensity of illumination in the vicinity of the vehicle, is issued, and a light OFF switch position at which an instruction to turn the head lights off is issued, the light ON switch position, the automatic light switch position, and the light OFF switch position being arranged in an order along a rotation direction. The rotary operation element is provided with a momentary mechanism with which the rotary operation element automatically returns to the automatic light switch position when there is no rotation operation force in a state where the rotary operation element is at a position between the automatic light switch position and the light OFF switch position.

A second aspect of the disclosure relates to an automatic light control device including a lever switch and a controller. The lever switch includes a lever main body and a rotary operation element provided with a light ON switch position at which an instruction to cause head lights and small lights installed in a vehicle to be on at all times is issued, an automatic light switch position at which an instruction to set an automatic light mode, in which a turned-on state of the head lights and the small lights is controlled based on the intensity of illumination in the vicinity of the vehicle, is issued, and a light OFF switch position at which an instruction to turn the head lights off is issued, the light ON switch position, the automatic light switch position, and the light OFF switch position being arranged in an order along a rotation direction. The rotary operation element is provided with a momentary mechanism with which the rotary operation element automatically returns to the automatic light switch position when there is no rotation operation force in a state where the rotary operation element is at a position between the automatic light switch position and the light OFF switch position. The controller is configured to acquire information about the intensity of illumination in the vicinity of the vehicle, the traveling state of the vehicle, and the switch position of the rotary operation element of the lever switch and to control the turning on and off of the head lights and the small lights based on the acquired information, and the controller is configured to turn the head lights and the small lights on when the rotary operation element is at the automatic light switch position and the intensity of illumination in the vicinity of the vehicle is equal to or lower than a predetermined value.

In the automatic light control device according to the second aspect, the controller may be configured to turn the head lights off when all of the following conditions i) to iv) are satisfied and the rotary operation element is rotated to the light OFF switch position, i) the intensity of illumination in the vicinity of the vehicle is equal to or lower than the predetermined value, ii) the rotary operation element is at the automatic light switch position, iii) the vehicle is in a stopped state, and iv) the head lights and the small lights are in a turned-on state.

In the automatic light control device according to the second aspect, the controller may be configured to turn the small lights off in a case where a state where the rotary operation element is held at the light OFF switch position continues for a predetermined time after the head lights are turned off.

In the automatic light control device according to the second aspect, the controller may be configured to turn the head lights and the small lights on in a case where all of the following conditions i) to iv) are satisfied and the vehicle is in a traveling state or in a case where all of the following conditions i) to iv) are satisfied and a state where the rotary operation element is held at the light OFF switch position does not continue for a predetermined time after the rotary operation element is operated from the automatic light switch position, i) the intensity of illumination in the vicinity of the vehicle is equal to or lower than the predetermined value, ii) the rotary operation element is at the automatic light switch position, iii) the vehicle is in a stopped state, and iv) the head lights are in a turned-off state.

In the automatic light control device according to the second aspect, the controller may be configured to turn the small lights off in a case where all of the following conditions i) to iii) are satisfied and a state where the rotary operation element is held at the light OFF switch position continues for a predetermined time after the rotary operation element is operated from the automatic light switch position, i) the intensity of illumination in the vicinity of the vehicle is equal to or lower than the predetermined value, ii) a vehicle is in a stopped state, and iii) the head lights are in a turned-off state.

In the automatic light control device according to the second aspect, the controller may be configured to turn the head lights and the small lights on in a case where all of the following conditions i) to iii) are satisfied and the vehicle is in a traveling state or in a case where all of the following conditions i) to iii) are satisfied and the rotary operation element is rotated to the light OFF switch position, i) the intensity of illumination in the vicinity of the vehicle is equal to or lower than the predetermined value, ii) the rotary operation element is at the automatic light switch position, and iii) the head lights and the small lights are in a turned-off state.

According to the aspects, even when the rotary operation element is operated to the light OFF switch position by an operator, the rotary operation element automatically returns to the automatic light switch position. Therefore, it is possible to cause the vehicle to enter an automatic light control state after the head lights are turned off and the head lights are automatically turned on when the vehicle travels. Accordingly, it is possible to suppress the vehicle from traveling with no light.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment

In the case of a lever switch according to the embodiment of the disclosure which controls lights provided in a vehicle, a rotary operation element (knob) that is provided at a tip end portion of the lever switch and that operates the turning on and off of the lights automatically returns to an automatic light switch position due to a momentary mechanism without being fixed at a light OFF switch position at which an instruction to turn the lights off is issued. Therefore, since an automatic light control state can be entered even after head lights are turned off, the head lights are automatically turned on when a vehicle travels and thus it is possible to suppress the vehicle from traveling with no light.

Hereinafter, a lever switch according to an embodiment of the disclosure will be described in detail with reference to drawings.

Configuration

Figure 1A:
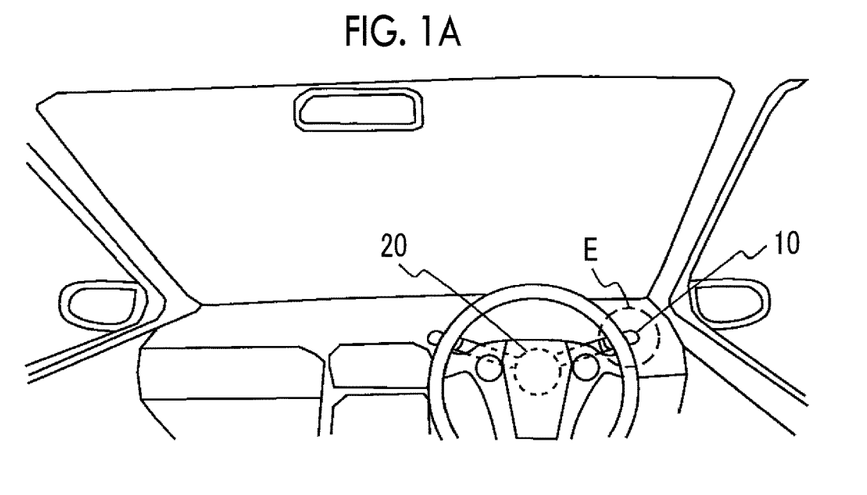
FIG. 1A is a schematic view of the inside of a vehicle cabin in which a lever switch according to an embodiment is provided.
Figure 1B:
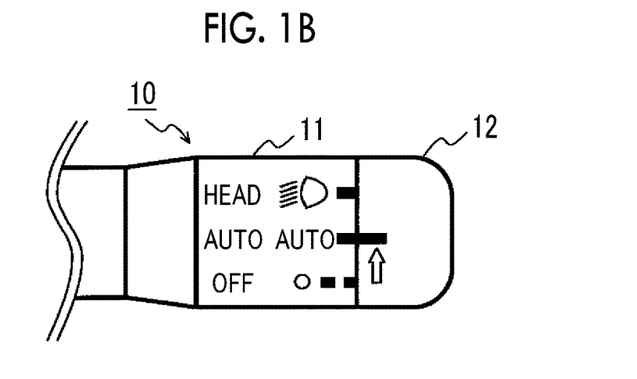
FIG. 1B is an enlarged view of a tip end portion of the lever switch shown in FIG. 1A.

FIG. 1A is a schematic view of the inside of a vehicle cabin in which a lever switch 10 according to the embodiment of the disclosure is provided and FIG. 1B is an enlarged view of a tip end portion of the lever switch 10 shown in FIG. 1A. In a right-hand drive vehicle shown in FIGS. 1A and 1B, the lever switch 10 according to the embodiment is disposed on a right side portion of a steering column 20 of the vehicle such that the lever switch 10 protrudes from the steering column 20. In the case of a left-hand drive vehicle, the lever switch 10 may be disposed on the right side portion of the steering column 20 of the vehicle in the same manner as in the right-hand drive vehicle or the lever switch 10 may be disposed on a left side portion of the steering column 20 of the vehicle while being laterally inverted. The lever switch 10 is provided with a lever main body 11 and a rotary operation element 12.

The lever main body 11 is a rod-shaped member and is supported by the right side portion of the steering column 20 of the vehicle such that the lever main body 11 can be inclined in a front-rear direction and a vertical direction. The lever main body 11 is configured such that optical axes of head lights can be switched or turning signal lamps can be turned on and off by inclining an axis of the lever main body 11. For example, by operating the lever main body 11 in a frontward direction (direction away from operator), it is possible to switch from low beams to high beams in a case where the head lights are in a turned-on state. In addition, by operating the lever main body 11 in a rearward direction (direction toward operator), it is possible to cause the head lights to be turned on such that the high beams are turned on while the lever main body 11 is being operated. In addition, by operating the lever main body 11 in an upward direction (counter-clockwise direction around axis of steering column 20), it is possible to operate a left turning signal lamp. In addition, by operating the lever main body 11 in a downward direction (clockwise direction around axis of steering column 20), it is possible to operate a right turning signal lamp.

The switching between the low beams and high beams of the head lights and the operating of the turning signal lamps are performed when a predetermined operation signal (electric signal) corresponding to a direction in which the lever main body 11 is operated is output from the lever switch 10 to a controller 60 which will be described later and the controller 60 controls the head lights and the turning signal lamps based on the operation signal received from the lever switch 10.

The rotary operation element 12 is provided at a tip end portion of the lever main body 11 such that the rotary operation element 12 can be rotated around the axis of the lever main body 11. The rotary operation element 12 is configured such that the rotary operation element 12 can operate the turning on and off of the head lights and small lights based on predetermined rotation positions provided on the lever main body 11. As the rotation positions of the rotary operation element 12, a light ON switch position (HEAD) at which an instruction to cause the head lights and the small lights to be on at all times is issued, the automatic light switch position (AUTO) at which an automatic light mode, in which a turned-on state of the head lights and the small lights is controlled based on the intensity of illumination in the vicinity of the vehicle, is set, and the light OFF switch position (OFF) at which an instruction to turn the head lights off is issued are provided in an order along a rotation direction as shown in FIG. 1B.

Even when there is no operating force by which the operator performs a rotation operation, the rotary operation element 12 can be held at the light ON switch position (HEAD). In a case where the rotary operation element 12 is at the light ON switch position (HEAD), a "fully turned-on state" in which all of the head lights and the small lights of the vehicle are turned on is entered regardless of the intensity of illumination in the vicinity of the vehicle (daytime, nighttime, or like). When the rotary operation element 12 is at the light ON switch position (HEAD), the rotary operation element 12 is allowed to rotate to the automatic light switch position (AUTO) from the light ON switch position (HEAD) and is restricted from rotating in a direction opposite to the automatic light switch position (AUTO) by a stopper mechanism or the like (not shown).

In addition, even when there is no operating force by which the operator performs the rotation operation, the rotary operation element 12 can be held at the automatic light switch position (AUTO). In a case where the rotary operation element 12 is at the automatic light switch position (AUTO), a "fully turned-off state" in which all of the head lights and the small lights of the vehicle are turned off is entered when the intensity of illumination in the vicinity of the vehicle exceeds a predetermined value (daytime or like) and the "fully turned-on state" in which all of the head lights and the small lights of the vehicle are turned on is entered when the intensity of illumination in the vicinity of the vehicle is equal to or lower than the predetermined value. When the rotary operation element 12 is at the automatic light switch position (AUTO), the rotary operation element 12 is allowed to rotate to the light ON switch position (HEAD) from the automatic light switch position (AUTO) and to rotate to the light OFF switch position (OFF) from the automatic light switch position (AUTO).

Meanwhile, the rotary operation element 12 is configured to automatically return to the automatic light switch position (AUTO when the rotary operation element 12 is at a position between the automatic light switch position (AUTO) and the light OFF switch position (OFF) and there is no operating force by which the operator performs the rotation operation (to rotate in direction shown by arrow in FIG. 1B which is enlarged view of E part). That is, the rotary operation element 12 has a structure in which a momentary mechanism is provided at the automatic light switch position (AUTO). The momentary mechanism can be realized by applying an urging force toward the automatic light switch position (AUTO) side to the rotary operation element 12 at the light OFF switch position (OFF) to an extent the operator can perform the rotation operation, at all times. In a case where the rotary operation element 12 is rotated to the light OFF switch position (OFF), the head lights are turned off or the small lights are turned off based on the state of the vehicle. Light control based on the light OFF switch position (OFF) will be described later. While the rotary operation element 12 can be rotated to the light OFF switch position (OFF) from the automatic light switch position (AUTO), the rotary operation element 12 is restricted from rotating beyond the light OFF switch position (OFF) by the stopper mechanism or the like (not shown).

The turning on and off of the head lights and the small lights are performed when a predetermined operation signal (electric signal) corresponding to a rotation position (HEAD, AUTO, and OFF) of the rotary operation element 12 is output from the lever switch 10 to the controller 60 which will be described later and the controller 60 controls the turning on and off of the head lights and the turning signal lamps based on the operation signal received from the lever switch 10.

Figure 2:
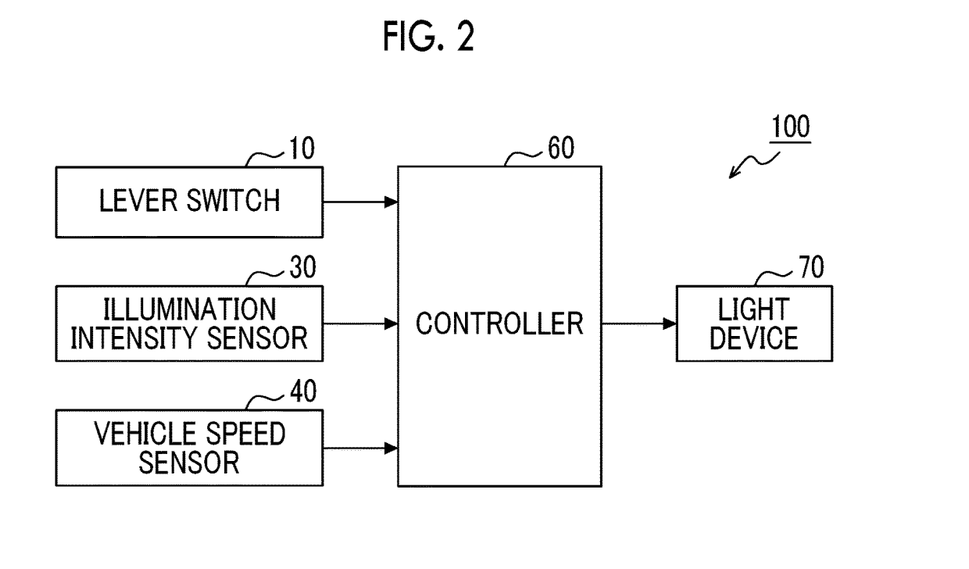
FIG. 2 is a schematic configuration diagram of an automatic light control device including the lever switch according to the embodiment.

FIG. 2 is a schematic configuration diagram of an automatic light control device 100 including the lever switch 10 according to the embodiment. The automatic light control device 100 shown in FIG. 2 is configured to include the lever switch 10, an illumination intensity sensor 30, a vehicle speed sensor 40, the controller 60, and light devices 70.

The illumination intensity sensor 30 is a sensor that can measure the intensity of illumination in the vicinity of the vehicle. For the illumination intensity sensor 30, for example, a phototransistor or a photodiode is used. The illumination intensity sensor 30 is provided at a predetermined position in the vehicle such that the illumination intensity sensor 30 can receive external light through a windshield, examples of the predetermined position including a position on an installment panel or a position on a rear dashboard. A signal (illumination intensity signal) indicating the intensity of illumination measured by the illumination intensity sensor 30 is output to the controller 60.

The vehicle speed sensor 40 is a sensor that can acquire the traveling speed of the vehicle (vehicle speed). As the vehicle speed sensor 40, a sensor or the like that detects the number of times of rotation of an output shaft of a transmission (not shown) can be used. A signal (vehicle speed signal) indicating the vehicle speed measured by the vehicle speed sensor 40 is output to the controller 60.

The operation signal from the lever switch 10, the illumination intensity signal from the illumination intensity sensor 30, and the vehicle speed signal from the vehicle speed sensor 40 are input to the controller 60. Based on information about the intensity of illumination in the vicinity of the vehicle, the traveling state of the vehicle, and the switch position of the rotary operation element 12 of the lever switch 10 which is obtained from the operation signal, the illumination intensity signal, and the vehicle speed signal, the controller 60 controls the light devices 70 such as head lights and small lights provided in the vehicle.

The entire controller 60 or part of the controller 60 may be typically configured as an electronic control unit (ECU) including a central processing unit (CPU), a memory, and an input and output interface. In the electronic control unit, a function of automatic light control which will be described later is realized when a program stored in the memory is read and executed by the CPU. In an example shown in FIG. 2, the controller 60 is configured independently of the lever switch 10. However, the controller 60 may be integrated with the lever switch 10 by being incorporated in the lever switch 10.

Control in Automatic Light Mode

Figure 3:
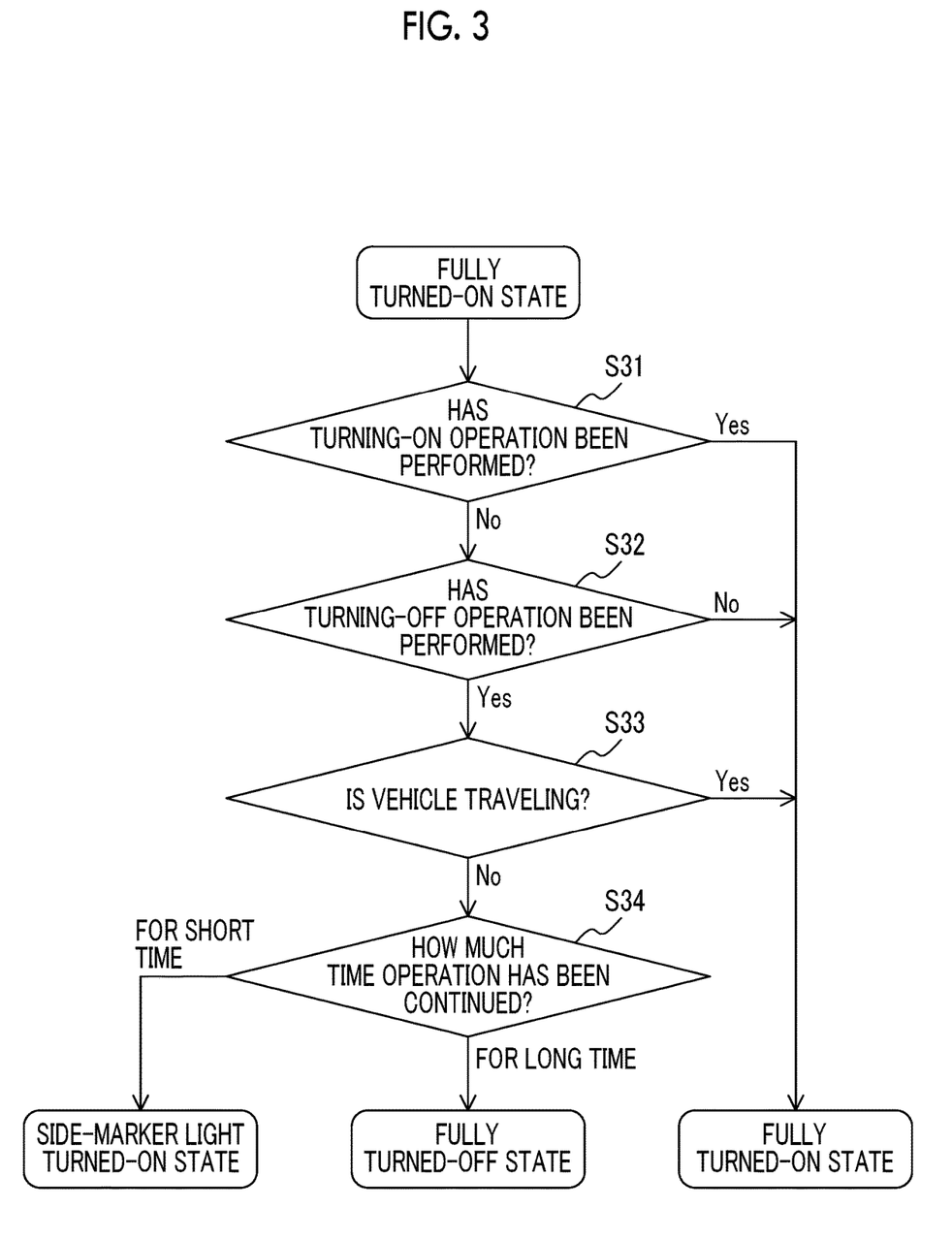
FIG. 3 is a control flowchart at the time of a fully turned-on state of lights.
Figure 4:
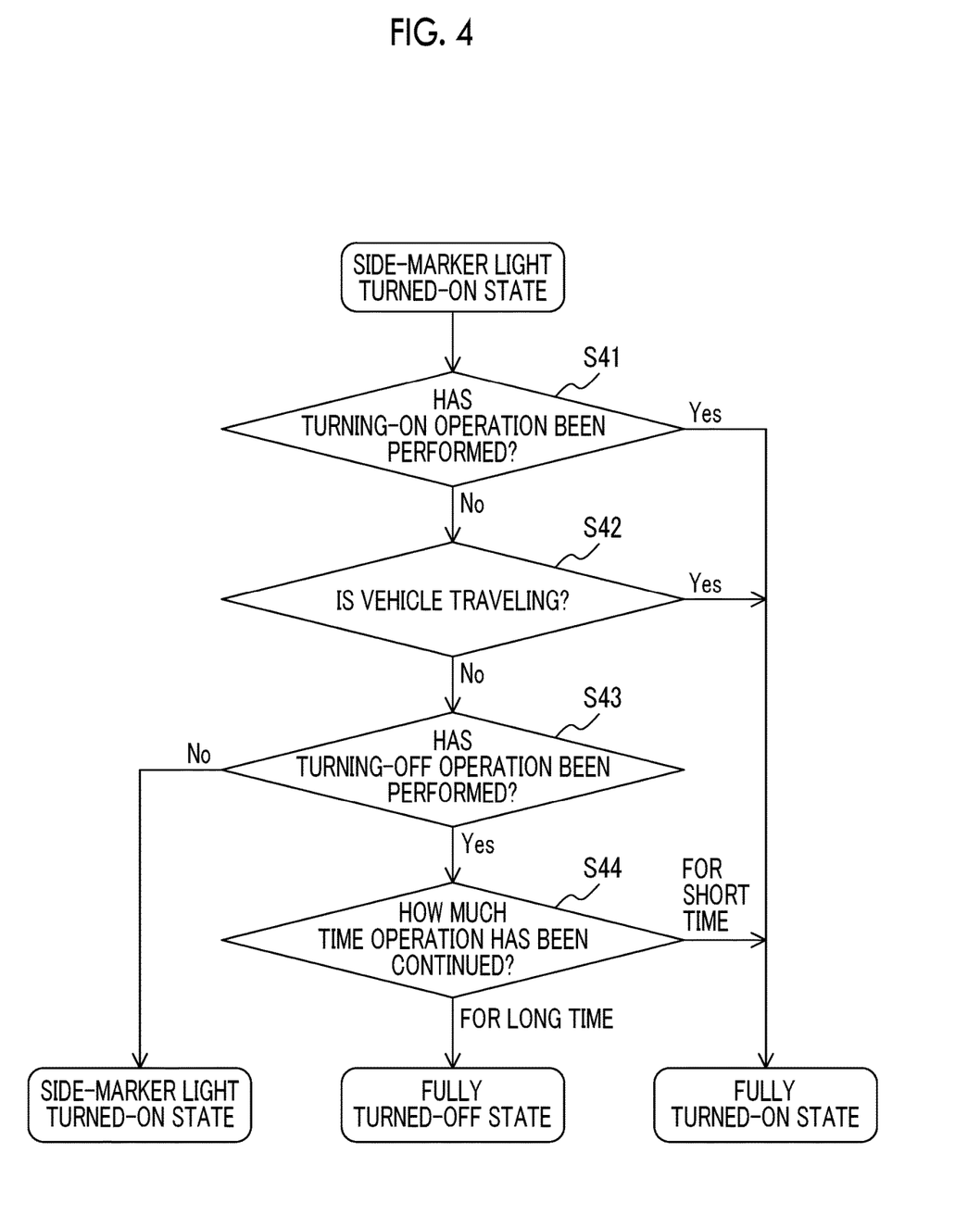
FIG. 4 is a control flowchart at the time of a side-marker light turned-on state of the lights.
Figure 5:
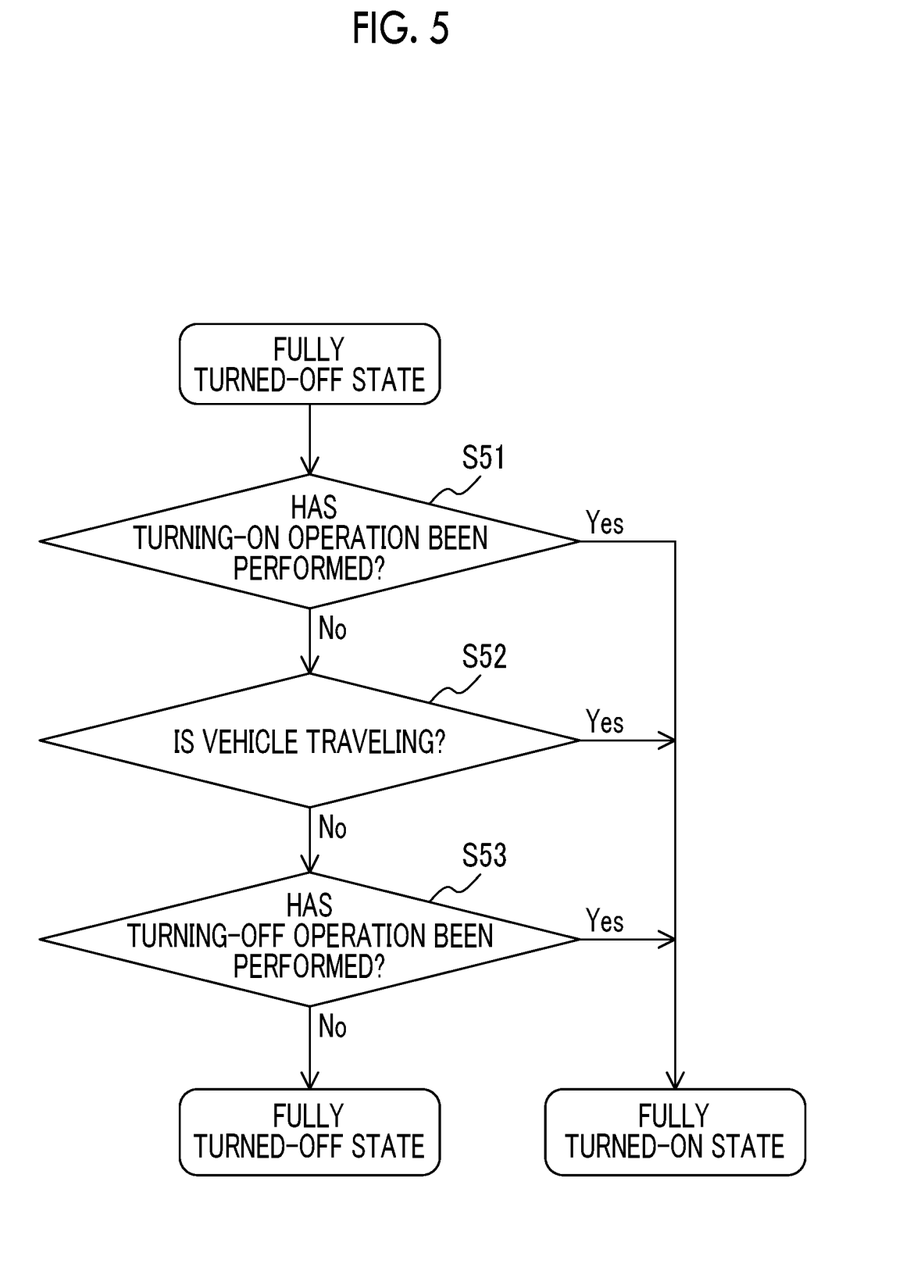
FIG. 5 is a control flowchart at the time of a fully turned-off state of the lights.
Figure 6:
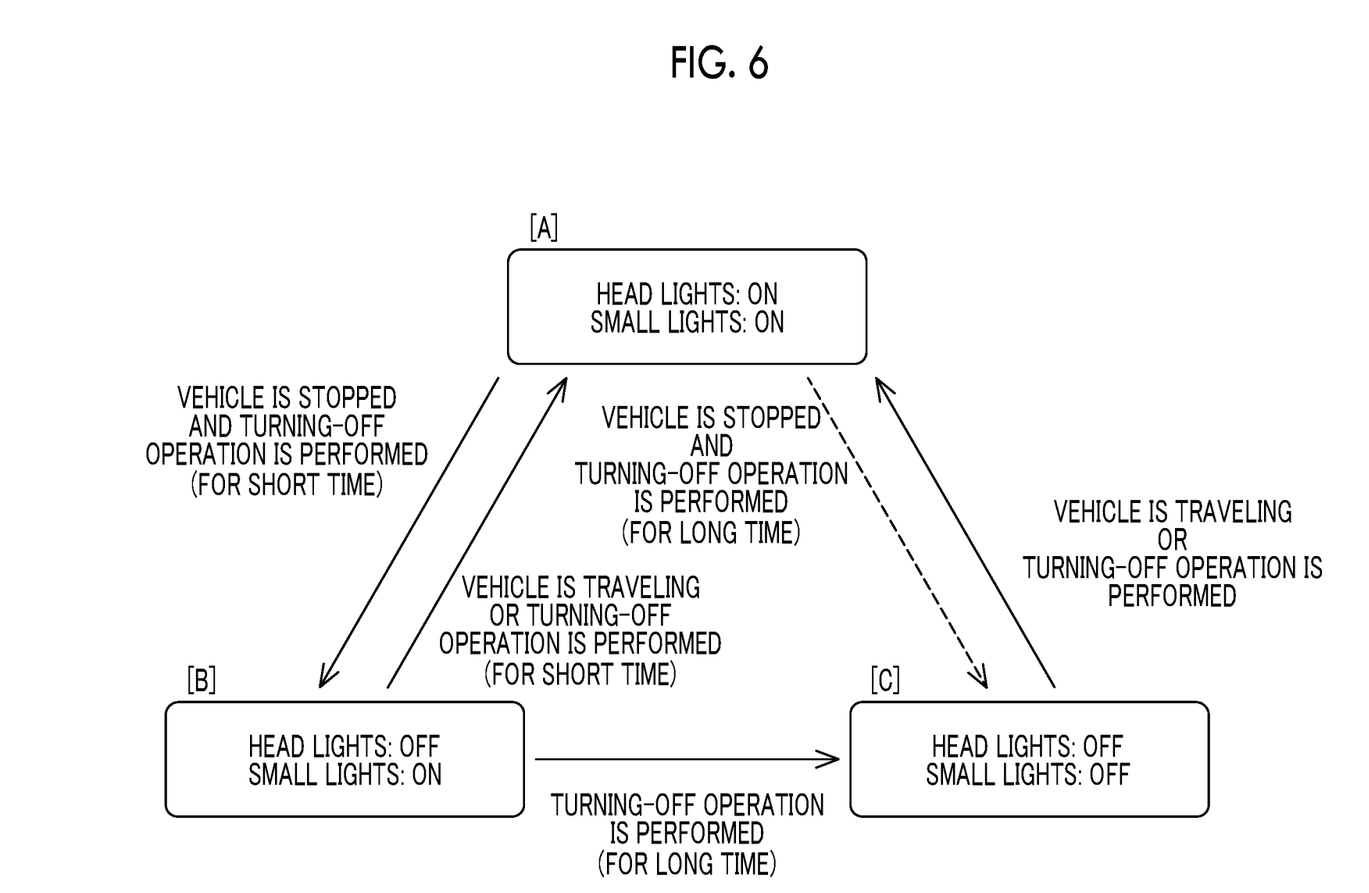
FIG. 6 is an on/off state transition diagram of the lights.

With reference to FIGS. 3 to 6, control in the automatic light mode performed by the automatic light control device 100 including the lever switch 10 according to the embodiment will be described. FIG. 3 is a control flowchart at the time of the fully turned-on state in which all of the head lights and the small lights are turned on (ON). FIG. 4 is a control flowchart at the time of a side-marker light turned-on state in which the head lights are turned off (OFF) and the small lights are turned on (ON). FIG. 5 is a control flowchart at the time of the fully turned-off state in which all of the head lights and the small lights are turned off (OFF). FIG. 6 is an on/off state transition diagram of the head lights and the small lights based on the flowcharts in FIGS. 3 to 5.

In the case of the control in the automatic light mode which is set when the rotary operation element 12 is at the automatic light switch position (AUTO), the head lights and the small lights are turned on when the intensity of illumination in the vicinity of the vehicle becomes equal to or lower than the predetermined value (for example, value with which it is possible to determine whether vehicle is traveling at night or in tunnel or not) set in advance, in principle. In the following description, light control in the automatic light mode that is unusually performed when the intensity of illumination in the vicinity of the vehicle is equal to or lower than the predetermined value will be described.

1. Fully Turned-On State (FIG. 3)

In a case where the rotary operation element 12 is at the automatic light switch position (AUTO) in the fully turned-on state in which the head lights are turned on (ON) and the small lights are turned on (ON), the following control is performed.

Step S31: The controller 60 determines whether an operation (hereinafter, referred to as "turning-on operation") of rotating the rotary operation element 12 from the automatic light switch position (AUTO) to the light ON switch position (HEAD) has been performed or not based on the operation signal. In a case where the controller 60 determines that the turning-on operation has been performed, the fully turned-on state is maintained. In a case where the controller 60 determines that the turning-on operation has not been performed, the process proceeds to step S32.

Step S32: The controller 60 determines whether an operation (hereinafter, referred to as "turning-off operation") of rotating the rotary operation element 12 from the automatic light switch position (AUTO) to the light OFF switch position (OFF) has been performed or not based on the operation signal. In a case where the controller 60 determines that the turning-off operation has not been performed, the fully turned-on state is maintained. In a case where the controller 60 determines that the turning-off operation has been performed, the process proceeds to step S33.

Step S33: The controller 60 determines whether the vehicle is traveling or not based on the vehicle speed signal. The determination can be performed by determining whether the traveling speed (vehicle speed) of the vehicle is equal to or greater than a predetermined value or not. The predetermined value is desirably set to 0 km/h at which the vehicle is completely stopped. By determining whether the vehicle is stopped or not in this manner, it is possible to suppress the vehicle from traveling with no light. In a case where the controller 60 determines that the vehicle is traveling (Yes in S33 of FIG. 3), the turning-off operation in step S32 is overridden and the fully turned-on state is maintained. In a case where the controller 60 determines that the vehicle is stopped without traveling (No in S33 of FIG. 3), the process proceeds to step S34.

Step S34: The controller 60 determines whether a time for which the turning-off operation performed on the rotary operation element 12 has been continued is long or short based on the operation signal. Whether a time for which the turning-off operation has been continued is long or short can be determined by determining whether a time for which the rotary operation element 12 has been held at the light OFF switch position (OFF) exceeds a predetermined time set in advance or not. The predetermined time can be randomly set and can be set to a time sufficient to confirm an operation intention of the operator, for example. In a case where the controller 60 determines that a time for which the turning-off operation has been continued is short, transition from the fully turned-on state to the side-marker light turned-on state (transition of [A]→[B] shown in FIG. 6) is performed in accordance with the turning-off operation in step S32. In a case where the controller 60 determines that a time for which the turning-off operation has been continued is long, transition from the fully turned-on state to the fully turned-off state via the side-marker light turned-on state (transition of [A]→[B]→[C] shown in FIG. 6) is performed in accordance with the turning-off operation in step S32.

In this manner, in a case where a time for which the turning-off operation on the rotary operation element 12 has been continued with the vehicle stopped in the fully turned-on state is long, a switch from the fully turned-on state to the side-marker light turned-on state ([A]→[B] in FIG. 6) is performed first and a switch from the side-marker light turned-on state to the fully turned-off state ([B]→[C] in FIG. 6) is performed thereafter such that transition from the fully turned-on state to the fully turned-off state is performed. Note that, in a case where a time for which the turning-off operation on the rotary operation element 12 has been continued with the vehicle stopped in the fully turned-on state is long, a switch from the fully turned-on state to the fully turned-off state may be performed directly not via the side-marker light turned-on state at a time at which a long-time turning-off operation is confirmed ([A]→[C] represented by dotted line in FIG. 6).

2. Side-Marker Light Turned-On State (FIG. 4)

In a case where the rotary operation element 12 is at the automatic light switch position (AUTO) in the side-marker light turned-on state in which the head lights are turned off (OFF) and the small lights are turned on (ON), the following control is performed.

Step S41: The controller 60 determines whether the turning-on operation on the rotary operation element 12 has been performed or not based on the operation signal. In a case where the controller 60 determines that the turning-on operation has been performed, transition from the side-marker light turned-on state to the fully turned-on state (transition of [B]→[A] shown in FIG. 6) is performed. In a case where the controller 60 determines that the turning-on operation has not been performed, the process proceeds to step S42.

Step S42: The controller 60 determines whether the vehicle is traveling or not based on the vehicle speed signal. The determination is performed in the same manner as that in step S33. In a case where the controller 60 determines that the vehicle is traveling (Yes in S42 of FIG. 4), transition from the side-marker light turned-on state to the fully turned-on state (transition of [B]→[A] shown in FIG. 6) is performed to suppress the vehicle from traveling with no light. In a case where the controller 60 determines that the vehicle is stopped without traveling (No in S42 of FIG. 4), the process proceeds to step S43.

Step S43: The controller 60 determines whether the turning-off operation on the rotary operation element 12 has been performed or not based on the operation signal. In a case where the controller 60 determines that the turning-off operation has not been performed, the side-marker light turned-on state is maintained. In a case where the controller 60 determines that the turning-off operation has been performed, the process proceeds to step S44.

Step S44: The controller 60 determines whether a time for which the turning-off operation performed on the rotary operation element 12 has been continued is long or short based on the operation signal. The determination on whether a time for which the turning-off operation has been continued is long or short is performed in the same manner as that in step S34. In a case where the controller 60 determines that a time for which the turning-off operation has been continued is short, transition from the side-marker light turned-on state to the fully turned-on state (transition of [B]→[A]

shown in FIG. 6) is performed in accordance with the turning-off operation in step S43. In a case where the controller 60 determines that a time for which the turning-off operation has been continued is long, transition from the side-marker light turned-on state to the fully turned-off state (transition of [B]→[C] shown in FIG. 6) is performed in accordance with the turning-off operation in step S43.

3. Fully Turned-Off State (FIG. 5)

In a case where the rotary operation element 12 is at the automatic light switch position (AUTO) in the fully turned-off state in which the head lights are turned off (OFF) and the small lights are turned off (OFF), the following control is performed.

Step S51: The controller 60 determines whether the turning-on operation on the rotary operation element 12 has been performed or not based on the operation signal. In a case where the controller 60 determines that the turning-on operation has been performed, transition from the fully turned-off state to the fully turned-on state (transition of [C]→[A] shown in FIG. 6) is performed. In a case where the controller 60 determines that the turning-on operation has not been performed, the process proceeds to step S52.

Step S52: The controller 60 determines whether the vehicle is traveling or not based on the vehicle speed signal. The determination is performed in the same manner as that in step S33. In a case where the controller 60 determines that the vehicle is traveling (Yes in S52 of FIG. 5), transition from the fully turned-off state to the fully turned-on state (transition of [C]→[A] shown in FIG. 6) is performed to suppress the vehicle from traveling with no light. In a case where the controller 60 determines that the vehicle is stopped without traveling (No in S52 of FIG. 5), the process proceeds to step S53.

Step S53: The controller 60 determines whether the turning-off operation on the rotary operation element 12 has been performed or not based on the operation signal. In a case where the controller 60 determines that the turning-off operation has not been performed, the fully turned-off state is maintained. In a case where the controller 60 determines that the turning-off operation has been performed, transition from the fully turned-off state to the fully turned-on state (transition of [C]→[A] shown in FIG. 6) is performed.

Figure 7:
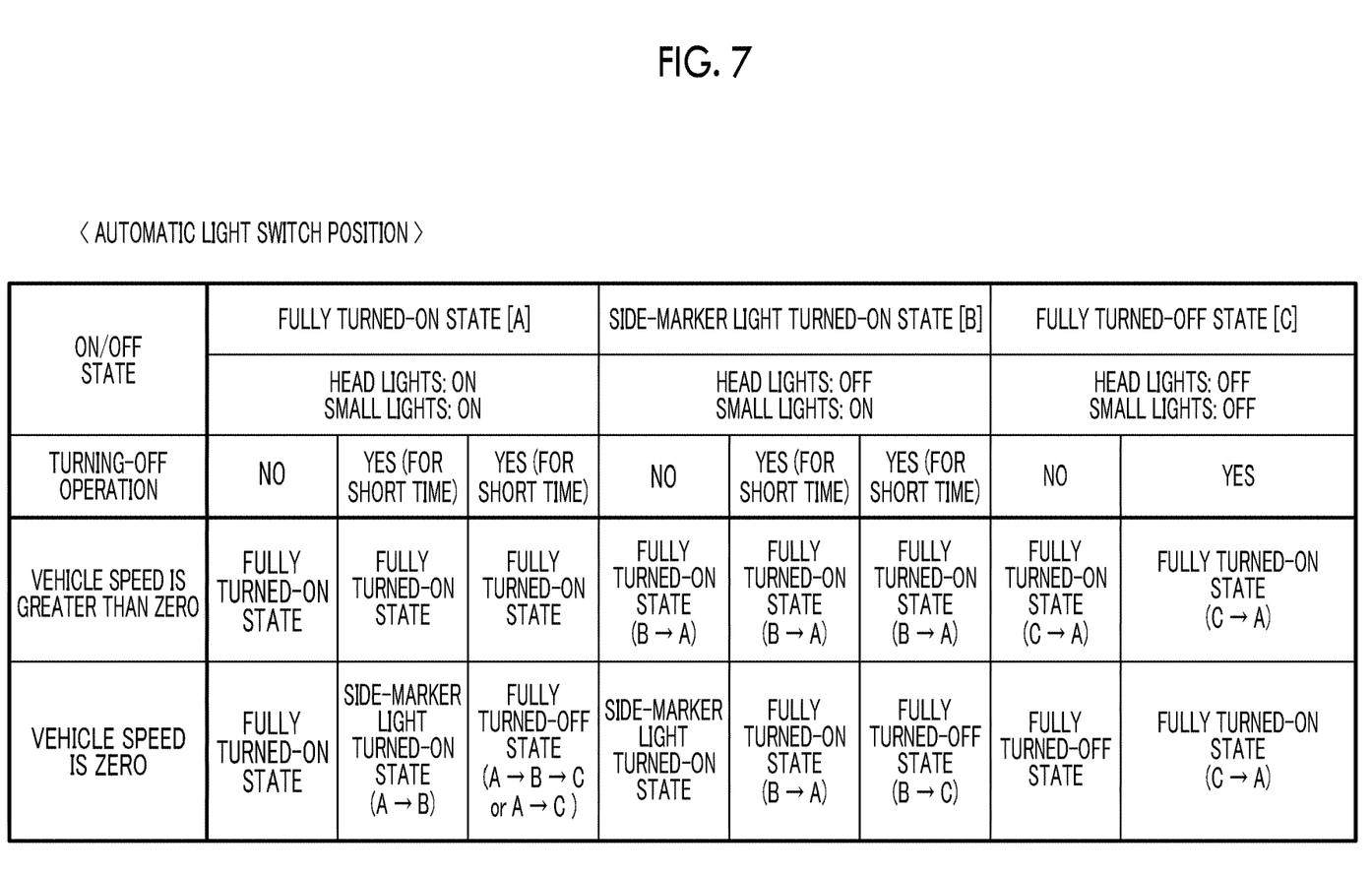
FIG. 7 is a table illustrating a relationship between the on/off states of the lights in an automatic light mode.

FIG. 7 is a table illustrating a relationship between the turning-off operation, the vehicle speed, and the on/off states of the head lights and the small lights in the control in the automatic light mode which is performed when the intensity of illumination in the vicinity of the vehicle is equal to or lower than the predetermined value. [A], [B], and [C] in FIG. 7 coincide with [A], [B], and [C] in a state transition diagram in FIG. 6. As understood from FIG. 7, with the automatic light control according to the embodiment, it is possible to cause the head lights and the small lights to enter the fully turned-on state in a case where the vehicle is in a traveling state and to cause the head lights and the small lights to enter the side-marker light turned-on state or the fully turned-off state in a case where the vehicle is in a stopped state.

Operation and Effect

As described above, in the case of the lever switch 10 and the automatic light control device 100 including the lever switch 10 according to the embodiment of the disclosure, the rotary operation element 12 of the lever switch 10 is provided with the momentary mechanism with which the rotary operation element 12 automatically returns to the automatic light switch position (AUTO) when there is no operating force by which the operator performs the rotation operation even when the operator performs a rotation operation to the light OFF switch position (OFF) such that the head lights are turned off.

Due to the momentary mechanism, the rotary operation element 12 returns to the automatic light switch position (AUTO) at which the automatic light mode, in which the automatic light control is performed, at all times unless the rotary operation element 12 is at the light ON switch position (HEAD) at which the head lights and the small lights are turned on. Accordingly, even when the vehicle stopped with the head lights turned off starts to travel at night without an operation of turning the head lights on, the controller 60 determines that the vehicle speed is greater than zero and thus the head lights can be automatically turned on according to the automatic light control. Therefore, it is possible to suppress the vehicle from traveling with no light.

In addition, even when the controller 60 causes the head lights in a turned-off state to be turned on according to the automatic light control, the operator is not confused and the operator does not feel a sense of incompatibility since the rotary operation element 12 of the lever switch 10 is at the automatic light switch position (AUTO) and the on/off states of the head lights match the position of the rotary operation element 12.

Reference Example

The automatic light control device 100 according to the embodiment may be provided with a shift position sensor that can detect which of a parking range (P), a reverse range (R), a neutral range (N), and a drive range (D) a shift position operated by the operator is in. When the shift position sensor is provided, the controller 60 can acquire a shift position signal indicating the shift position detected by the shift position sensor and can perform control in an automatic light mode as described below based on the shift position signal.

In the case of the side-marker light turned-on state in which the head lights are turned off (OFF) and the small lights are turned on (ON), the controller 60 determines whether the shift position is in the parking range (P) or is in a range other than the parking range (P) based on the shift position signal. In a case where the shift position is in a range other than the parking range (P), there is a possibility that the vehicle moves and thus the controller 60 maintains the side-marker light turned-on state. In a case where the shift position is in the parking range (P), there is no possibility that the vehicle moves and thus transition from the side-marker light turned-on state to the fully turned-off state is performed. The transition from the side-marker light turned-on state to the fully turned-off state is may be performed in a case where a time for which the turning-off operation on the rotary operation element 12 has been continued is long.

In addition, in the case of the fully turned-off state in which the head lights are turned off (OFF) and the small lights are turned off (OFF), the controller 60 determines whether the shift position is in the parking range (P) or is in a range other than the parking range (P) based on the shift position signal. In a case where the shift position is in the parking range (P), there is no possibility that the vehicle moves and thus the controller 60 maintains the fully turned-off state. In a case where the shift position is in a range other than the parking range (P), there is a possibility that the vehicle moves and thus transition from the fully turned-off state to the fully turned-on state is performed.

The lever switch and the automatic light control device according to the embodiment of the disclosure can be used for a vehicle in which it is desirable that head lights or the like are automatically turned on and off in accordance with the state of the vehicle.

What is claimed is:

1. An automatic light control system comprising:
   a lever switch including:
   a lever main body, and
   a rotary operation element provided with a light ON switch position at which an instruction to cause head lights and small lights installed in a vehicle to be on at all times is issued, an automatic light switch position at which an instruction to set an automatic light mode, in which a turned-on state of the head lights and the small lights is controlled based on an intensity of illumination in a vicinity of the vehicle, is issued, and a light OFF switch position, the light ON switch position, the automatic light switch position, and the light OFF switch position being arranged in order along a rotation direction, and the rotary operation element being provided with a momentary mechanism with which the rotary operation element automatically returns to the automatic light switch position when there is no rotation operation force in a state where the rotary operation element is at a position between the automatic light switch position and the light OFF switch position; and
   a controller configured to acquire information about the intensity of illumination in the vicinity of the vehicle, a traveling state of the vehicle, and a switch position of the rotary operation element of the lever switch and to control turning on and off of the head lights and the small lights based on the acquired information,
   wherein the controller is configured to turn the head lights off when all of the following conditions i) to iv) are satisfied and the rotary operation element is rotated to the light OFF switch position,
   i) the intensity of illumination in the vicinity of the vehicle is equal to or lower than a predetermined value,
   ii) the rotary operation element is at the automatic light switch position,
   iii) the vehicle is in a stopped state, and
   iv) the head lights and the small lights are in a turned-on state.

2. The automatic light control system according to claim 1, wherein the controller is configured to turn the small lights off in a case where a state where the rotary operation element is held at the light OFF switch position continues for a predetermined time after the head lights are turned off.

3. A vehicle comprising:
   the automatic light control system according to claim 2, head lights, and
   small lights.

4. A vehicle comprising:
   the automatic light control system according to claim 1, head lights, and
   small lights.

5. An automatic light control system comprising:
   a lever switch including:
   a lever main body, and
   a rotary operation element provided with a light ON switch position at which an instruction to cause head lights and small lights installed in a vehicle to be on at all times is issued, an automatic light switch position at which an instruction to set an automatic light mode, in which a turned-on state of the head lights and the small lights is controlled based on an intensity of illumination in a vicinity of the vehicle, is issued, and a light OFF switch position, the light ON switch position, the automatic light switch position, and the light OFF switch position being arranged in order along a rotation direction, and the rotary operation element being provided with a momentary mechanism with which the rotary operation element automatically returns to the automatic light switch position when there is no rotation operation force in a state where the rotary operation element is at a position between the automatic light switch position and the light OFF switch position; and
   a controller configured to acquire information about the intensity of illumination in the vicinity of the vehicle, a traveling state of the vehicle, and a switch position of the rotary operation element of the lever switch and to control turning on and off of the head lights and the small lights based on the acquired information,
   wherein the controller is configured to turn the head lights and the small lights on in a case where all of the following conditions i) to iv) are satisfied and the vehicle is in a traveling state or in a case where all of the following conditions i) to iv) are satisfied and a state where the rotary operation element is held at the light OFF switch position does not continue for a predetermined time after the rotary operation element is operated from the automatic light switch position,
   i) the intensity of illumination in the vicinity of the vehicle is equal to or lower than a predetermined value,
   ii) the rotary operation element is at the automatic light switch position,
   iii) the vehicle is in a stopped state, and
   iv) the head lights are in a turned-off state.

6. A vehicle comprising:
   the automatic light control system according to claim 5, head lights, and
   small lights.

7. An automatic light control system comprising:
   a lever switch including:
   a lever main body, and
   a rotary operation element provided with a light ON switch position at which an instruction to cause head lights and small lights installed in a vehicle to be on at all times is issued, an automatic light switch position at which an instruction to set an automatic light mode, in which a turned-on state of the head lights and the small lights is controlled based on an intensity of illumination in a vicinity of the vehicle, is issued, and a light OFF switch position, the light ON switch position, the automatic light switch position, and the light OFF switch position being arranged in order along a rotation direction, and the rotary operation element being provided with a momentary mechanism with which the rotary operation element automatically returns to the automatic light switch position when there is no rotation operation force in a state where the rotary operation element is at a position between the automatic light switch position and the light OFF switch position; and
   a controller configured to acquire information about the intensity of illumination in the vicinity of the vehicle, a traveling state of the vehicle, and a switch position of the rotary operation element of the lever switch and to control turning on and off of the head lights and the small lights based on the acquired information, wherein the controller is configured to turn the small lights off in a case where all of the following conditions i) to iii) are satisfied and a state where the rotary operation element is held at the light OFF switch position continues for a predetermined time after the rotary operation element is operated from the automatic light switch position, i) the intensity of illumination in the vicinity of the vehicle is equal to or lower than a predetermined value, ii) the vehicle is in a stopped state, and iii) the head lights are in a turned-off state.

8. A vehicle comprising:
the automatic light control system according to claim 7, head lights, and
small lights.

9. An automatic light control system comprising:
a lever switch including:
  a lever main body, and
  a rotary operation element provided with a light ON switch position at which an instruction to cause head lights and small lights installed in a vehicle to be on at all times is issued, an automatic light switch position at which an instruction to set an automatic light mode, in which a turned-on state of the head lights and the small lights is controlled based on an intensity of illumination in a vicinity of the vehicle, is issued, and a light OFF switch position, the light ON switch position, the automatic light switch position, and the light OFF switch position being arranged in order along a rotation direction, and the rotary operation element being provided with a momentary mechanism with which the rotary operation element automatically returns to the automatic light switch position when there is no rotation operation force in a state where the rotary operation element is at a position between the automatic light switch position and the light OFF switch position; and a controller configured to acquire information about the intensity of illumination in the vicinity of the vehicle, a traveling state of the vehicle, and a switch position of the rotary operation element of the lever switch and to control turning on and off of the head lights and the small lights based on the acquired information, wherein the controller is configured to turn the head lights and the small lights on in a case where all of the following conditions i) to iii) are satisfied and the vehicle is in a traveling state or in a case where all of the following conditions i) to iii) are satisfied and the rotary operation element is rotated to the light OFF switch position, i) the intensity of illumination in the vicinity of the vehicle is equal to or lower than a predetermined value, ii) the rotary operation element is at the automatic light switch position, and iii) the head lights and the small lights are in a turned-off state.

10. A vehicle comprising:
the automatic light control system according to claim 7, head lights, and
small lights.

* * * * *